(12) United States Patent
Khang

(10) Patent No.: US 12,085,826 B2
(45) Date of Patent: Sep. 10, 2024

(54) PIXEL STRUCTURE OF LCoS DISPLAY

(71) Applicant: LIGAS TECHNOLOGY INC., Seongnam-si (KR)

(72) Inventor: Chang Man Khang, Seongnam-si (KR)

(73) Assignee: LIGAS TECHNOLOGY INC. (KR)

( * ) Notice: Subject to any disclaimer, the term of this patent is extended or adjusted under 35 U.S.C. 154(b) by 285 days.

(21) Appl. No.: 17/666,990

(22) Filed: Feb. 8, 2022

(65) Prior Publication Data

US 2022/0163830 A1    May 26, 2022

Related U.S. Application Data

(63) Continuation of application No. PCT/KR2020/008718, filed on Jul. 3, 2020.

(30) Foreign Application Priority Data

Aug. 13, 2019 (KR) .................. 10-2019-0098611

(51) Int. Cl.
G02F 1/1368 (2006.01)
G02F 1/1362 (2006.01)

(52) U.S. Cl.
CPC ...... G02F 1/1368 (2013.01); G02F 1/136277 (2013.01); G02F 2202/104 (2013.01)

(58) Field of Classification Search
CPC .................................................. G02F 1/136277

USPC ...................................................... 349/42–48
See application file for complete search history.

(56) References Cited

U.S. PATENT DOCUMENTS

| | | | |
|---|---|---|---|
| 2002/0126233 A1* | 9/2002 | Yamagishi | G02F 1/136277 349/43 |
| 2004/0041768 A1 | 3/2004 | Chen et al. | |
| 2006/0007192 A1 | 1/2006 | De Smet et al. | |
| 2007/0046885 A1 | 3/2007 | Kim et al. | |

FOREIGN PATENT DOCUMENTS

| | | |
|---|---|---|
| KR | 100581202 B1 | 5/2006 |
| KR | 20110075944 A | 7/2011 |

OTHER PUBLICATIONS

International Search Report dated Sep. 29, 2020 for International application No. PCT/KR2020/008718 with English translation (8 pages).

* cited by examiner

Primary Examiner — Charles S Chang
(74) Attorney, Agent, or Firm — Harness, Dickey & Pierce, P.L.C.

(57) ABSTRACT

An LCoS display pixel structure is disclosed. According to at least one embodiment, the present disclosure provides an LCoS display pixel structure which implements a pattern or geometry having an analog pixel structure in a display having micro-display LCoS structures.

8 Claims, 6 Drawing Sheets

PIXEL STRUCTURE OF LCoS DISPLAY

CROSS-REFERENCE TO RELATED APPLICATION

The present application is a continuation of International Application No. PCT/KR2020/008718, filed Jul. 3, 2020, which is based upon and claims priority to Patent Application No. 10-2019-0098611 filed in Korea on Aug. 13, 2019. The entire disclosure of the above application is incorporated herein by reference.

TECHNICAL FIELD

The present disclosure in some embodiments relates to a pixel structure of a Liquid Crystal on Silicon (LCoS) display.

BACKGROUND

The statements in this section merely provide background information related to the present disclosure and do not necessarily constitute prior art.

In a display device having Liquid Crystal on Silicon (LCoS) structures, a pixel is one of the principal factors determining the characteristics of video images. The pixel does not exist alone, but multiples of the pixel constitute an array of them. The array is configured as a passive matrix or an active matrix.

In the existing micro-displays, the LCoS pixel structure encounters two major issues. First, a digital pixel that is configured into an inverter latch of a PMOS and NMOS transistor can be hardly reduced in size to microminiaturize each pixel, which obstructs securing a process margin. Additionally, as a digital pixel is configured as an inverter latch, when an in-between value of VIL and VIH is inputted, a lot of short circuit current flows to destabilize the power supply, causing the power bouncing or power deep phenomenon to weaken the gray code that determines the color.

A second issue concerns an analog pixel composed of one transistor and one capacitor, which is subject to a limitation in the area, involving parasitic resistances and parasitic capacitances to effect the comparable amount of impediment, disabling the pixel from obtaining 100% charge. This issue affects the contrast ratio, the saturation, and the like, which in turn adversely affect the color quality of the analog pixel.

SUMMARY

The present disclosure in at least one embodiment seeks to provide an LCoS display pixel structure with elements for minimizing the above-mentioned deficiencies, which implements a pattern or geometry having an analog pixel structure in a display having micro-display LCoS structures.

At least one aspect of the present disclosure provides a pixel structure of a Liquid Crystal on Silicon (LCoS) display, including a switch transistor connected to a source line; a storage capacitor configured to store electric power transmitted through the switch transistor; and a reset transistor directly connected to the storage capacitor. Here, the switch transistor, the storage capacitor, and the reset transistor are respectively including an active area and polysilicon. the pixel structure is further including an output terminal that is connected by a metal contact (MC) to the active area, and the metal contact is shared by an adjacent pixel As described above, the present disclosure according to at least one embodiment can provide an LCoS display pixel structure that implements a pattern or geometry having an analog pixel structure in a display having micro-display LCoS structures.

Additionally, according to at least one embodiment, transistors in each pixel can each be drawn 1.4 times larger, thereby securing the flexibility of circuit design.

Further, the present disclosure according to at least one embodiment can sufficiently secure a process margin and reduce the occurrence of leakage current by minimizing the active area.

DETAILED DESCRIPTION

Figure 1A:
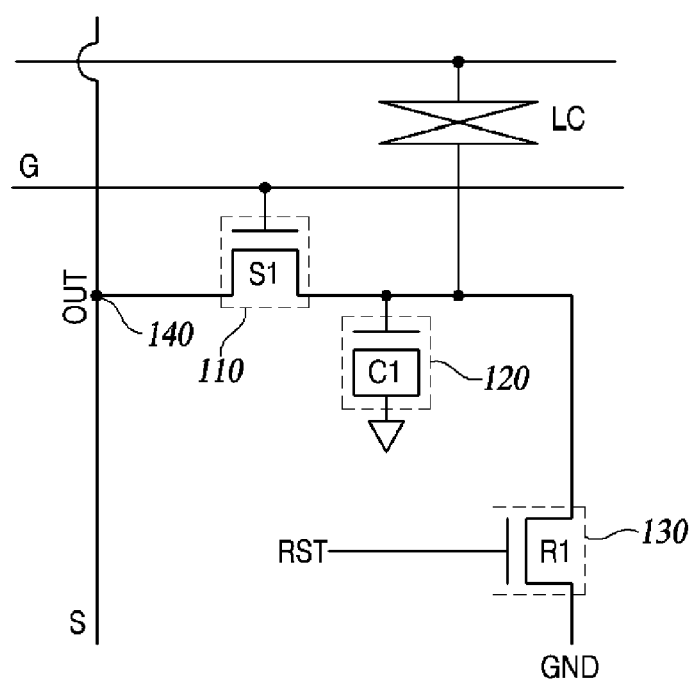
FIGS. 1A and 1B are, respectively, an internal circuit diagram of a pixel of an LCoS display and an internal circuit diagram of a pixel of the LCoS display, including parasitic components according to at least one embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order or sequence of the components. When components are described as 'connected', 'coupled', or 'linked' to another component, they are meant to not only directly 'connected', 'coupled', or 'linked' but also to indirectly 'connected', 'coupled', or 'linked' via one or more additional components.

Liquid Crystal on Silicon (LCoS) display may use single crystal silicon as a rear substrate, on which a display panel may be provided with built-in circuits having functions such as a scanner and a driver among other components. The substrate may be manufactured by using a conventional complementary metal-oxide-semiconductor (CMOS) processing technology on a single crystal silicon substrate (Si).

FIG. 1A is an internal circuit diagram of a pixel of an LCoS display according to at least one embodiment of the present disclosure.

As shown in FIG. 1A, the pixel of the LCoS display according to at least one embodiment includes a switch transistor 110, a storage capacitor 120, and a reset transistor 130.

The switch transistor 110 is connected to a source line S.

The storage capacitor 120 stores the power transmitted through the switch transistor 110. One end of the storage capacitor is connected to the switch transistor 110, and the other end of storage capacitor is grounded.

The reset transistor 130 is directly connected to the storage capacitor 120. Specifically, the reset transistor 130 has one end connected to the one end of the storage capacitor 120, and the other end of the reset transistor 130 is grounded.

The reset transistor 130 assists the LCoS display for a conventional RGB color scheme to operate in an RGBW scheme. In the RGB scheme, each pixel is provided with three sub-pixels such as red (R), green (G), and blue (B) sub-pixels. On the other hand, the RGBW scheme has a white (W) sub-pixel added to the existing arrangement of three sub-pixels of red (R), green (G), and blue (B) colors in the RGB scheme. The LCoS display pixel structure according to at least one embodiment utilizes the reset transistor 130 to operate an RGB display in the RGBW scheme.

Figure 1B:
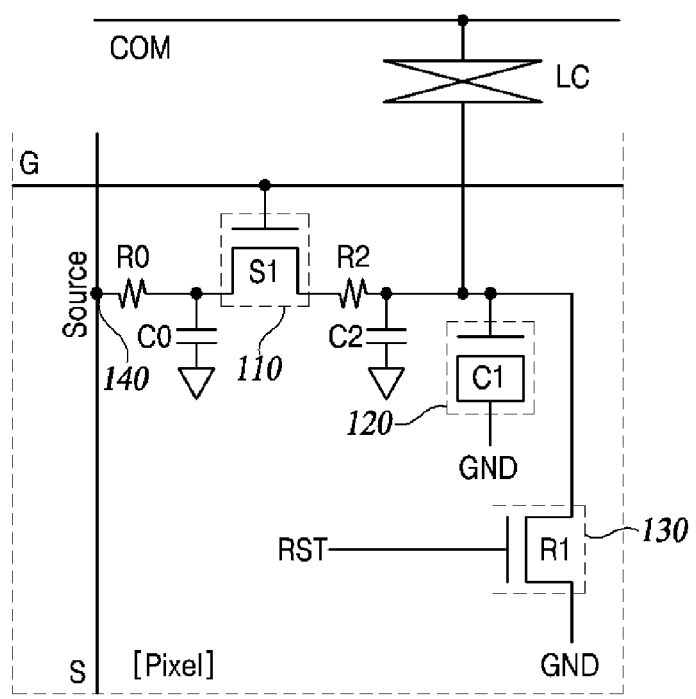

FIG. 1B is an internal circuit diagram of a pixel of an LCoS display including parasitic components according to at least one embodiment of the present disclosure.

The circuit of FIG. 1B shows the first resistor R0, first capacitor C0, second resistor R2, and second capacitor C2. The first resistor R0, first capacitor C0, second resistor R2, and second capacitor C2 are not physically installed circuit components. They just represent parasitic components may be generated in the process of driving the LCoS display according to at least one embodiment.

The first resistor R0 and the first capacitor C0 may be a parasitic component between the source line S and the switch transistor 110.

The second resistor R2 and second capacitor C2 may be a parasitic component between the switch transistor 110 and the storage capacitor 120.

In sum, FIG. 1A is the circuit diagram of the LCoS display pixel structure according to at least one embodiment, whereas FIG. 1B is the circuit diagram of the operating LCoS display pixel structure that accompanies the illustrated parasitic components.

The first resistor R0, first capacitor C0, second resistor R2, and second capacitor C2 may be designed such that their respective characteristic values are less than or equal to specific thresholds in order to reduce the circuit response delay to the minimum. For example, as devices having parasitic characteristics in the entire pixel circuit, the first resistor R0, first capacitor C0, second resistor R2, and second capacitor C2 are designed to minimize their respective characteristic values to minimize power consumption and support to fully supply the initially supplied power to the pixel.

As shown in FIGS. 1A and 1B, the liquid crystal LC of the LCoS display pixel according to at least one embodiment is connected to a contact point between the switch transistor 110, the storage capacitor 120, and the reset transistor 130.

Accordingly, the liquid crystal LC may be controlled by the voltage of the source line S applied to the one end of the switch transistor 110, the voltage of the gate line G applied to the gate of the switch transistor 110, and the RST voltage RST applied to the gate of the reset transistor 130.

Those pixels in the same row of a pixel array share the gate line G, and those pixels in the same row share the source line S. Accordingly, the liquid crystal LC of one pixel in the pixel array may be controlled by using a combination of the voltage of the gate line G and the voltage of the source line S. Here, in each pixel, the contact point between the switch transistor 110 and the source line S is referred to as an output terminal 140 of the pixel.

Figure 2:
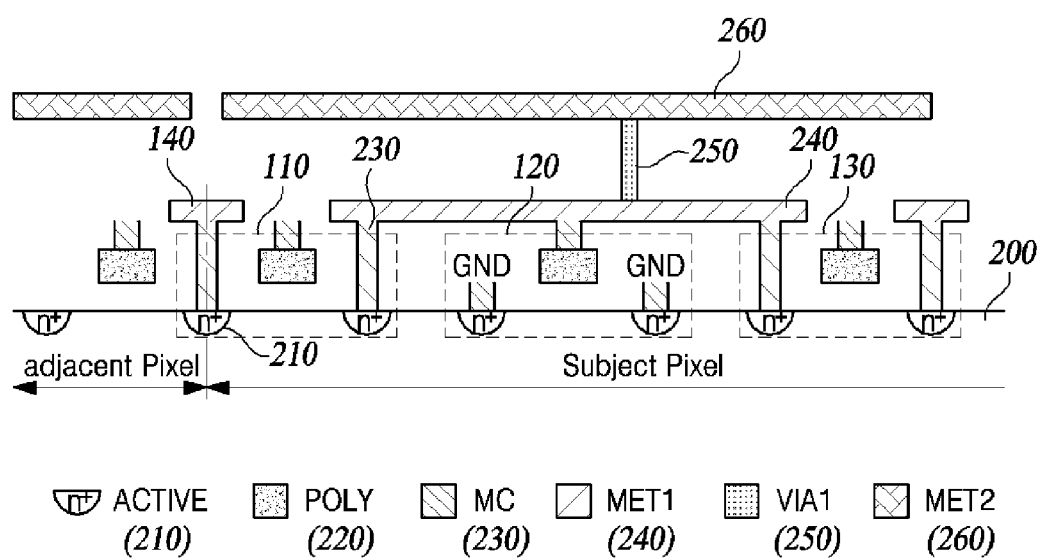
FIG. 2 is a cross-sectional view illustrating a pixel structure on an LCoS display according to at least one embodiment of the present disclosure.

FIG. 2 is a cross-sectional view illustrating a pixel structure on an LCoS display according to at least one embodiment of the present disclosure.

As shown in FIG. 2, the pixel structure of the LCoS display includes a silicon substrate 200, active areas 210, polysilicon 220, metal contacts (MC) 230, a first metal layer (Met 1) 240, a via hole 250, and a second metal layer (Met 2) 260. Components of the pixel structure of the LCoS display are not necessarily limited to these particular elements.

The silicon substrate 200 may include the active areas 210 and inactive areas. In the LCoS display substrate, single-crystal silicon may be used as the back substrate. The LCoS display pixel structure resides on a matrix of the active areas 210.

The active areas 210 are concave areas formed on the silicon substrate 200. The active areas 210 may be connected to the polysilicon 220 or the metal contacts 230.

The active areas 210 are a kind of junctions, and they are connected to the polysilicon 220 or the metal contact 230.

The polysilicon 220 is present between the active areas 210 and the first metal layer 240. The polysilicon 220 may be serves to connect the active areas 210 with the first metal layer 240. With the polysilicon 220 used, the gate of the switch transistor 110, one end of the storage capacitor 120, and the gate of the reset transistor 130 are implemented.

The metal contacts 230 are present between the active area 210 and the first metal layer 240. The metal contacts 230 may be serve to connect the active areas 210 with the first metal layer 240, connect the active areas 210 with the polysilicon 220, or connect polysilicon 220 with the first metal layer 240.

The first metal layer 240 is present between the second metal layer 260 and the active areas 210. According to some exemplary embodiments, the first metal layer 240 may be used as one plate of the storage capacitor 120.

The via hole 250 resides between the first metal layer 240 and the second metal layer 260. The via hole 250 may be serves to connect the first metal layer 240 with the second metal layer 260.

The second metal layer 260 may be connected to the first metal layer 240 through the via hole 250. According to some exemplary embodiments, the second metal layer 260 may be used as the other plate of the storage capacitor 120. That is, the first metal layer 240 and the second metal layer 260 may be used as plate of the storage capacitor 120, respectively.

A third metal layer (not shown) may be provided on the second metal layer 260 with the liquid crystal being filled between the second metal layer and the third metal layer, but the third metal layer and the liquid crystal belong to common technique, and a description thereof will be omitted in the present disclosure.

The switch transistor 110 and a reset transistor 130 may include active areas 210 and polysilicon 220. For example, the sources and drains of the switch transistor 110 and the reset transistor 130 are formed on the active areas 210, and the gates of the switch transistor 110 and the reset transistor 130 are formed of the polysilicon 220.

The storage capacitor 120 according to at least one embodiment of the present disclosure may include active areas 210 and the polysilicon 220. For example, the storage capacitor 120 is implemented as a MOS capacitor having a stacked structure of the active areas 210, an oxide film, and the polysilicon 220. The active areas 210 forming the storage capacitor 120 may be grounded by using a metal contact 230, and the polysilicon 220 forming the storage capacitor 120 may be connected to the switch transistor 110 and the reset transistor 130 by using metal contacts 230 and a first metal layer 240. Meanwhile, according to another embodiment of the present disclosure, the storage capacitor 120 is implemented as a metal-insulator-metal (MIM) capacitor that utilizes the first metal layer 240 and a second metal layer 260 as top plate and bottom plate, respectively.

The output terminal 140 according to at least one embodiment of the present disclosure may be connected by the metal contact 230 to the active areas 210. Here, the output terminal 140 is designed to be shared with an adjacent pixel.

The LCoS display pixel structure according to at least one embodiment allows adjacent pixels to share an output terminal 140, thereby minimizing the occurrence of a parasitic component. In the conventional LCoS display pixel structure, each pixel is provided with a separate output terminal 140 to generate parasitic components from the provided pixels, respectively. However, the LCoS display pixel structure according to at least one embodiment renders the output terminal 140 to be shared between neighboring pixels, thereby minimizing the generation of parasitic components.

Figure 3A:
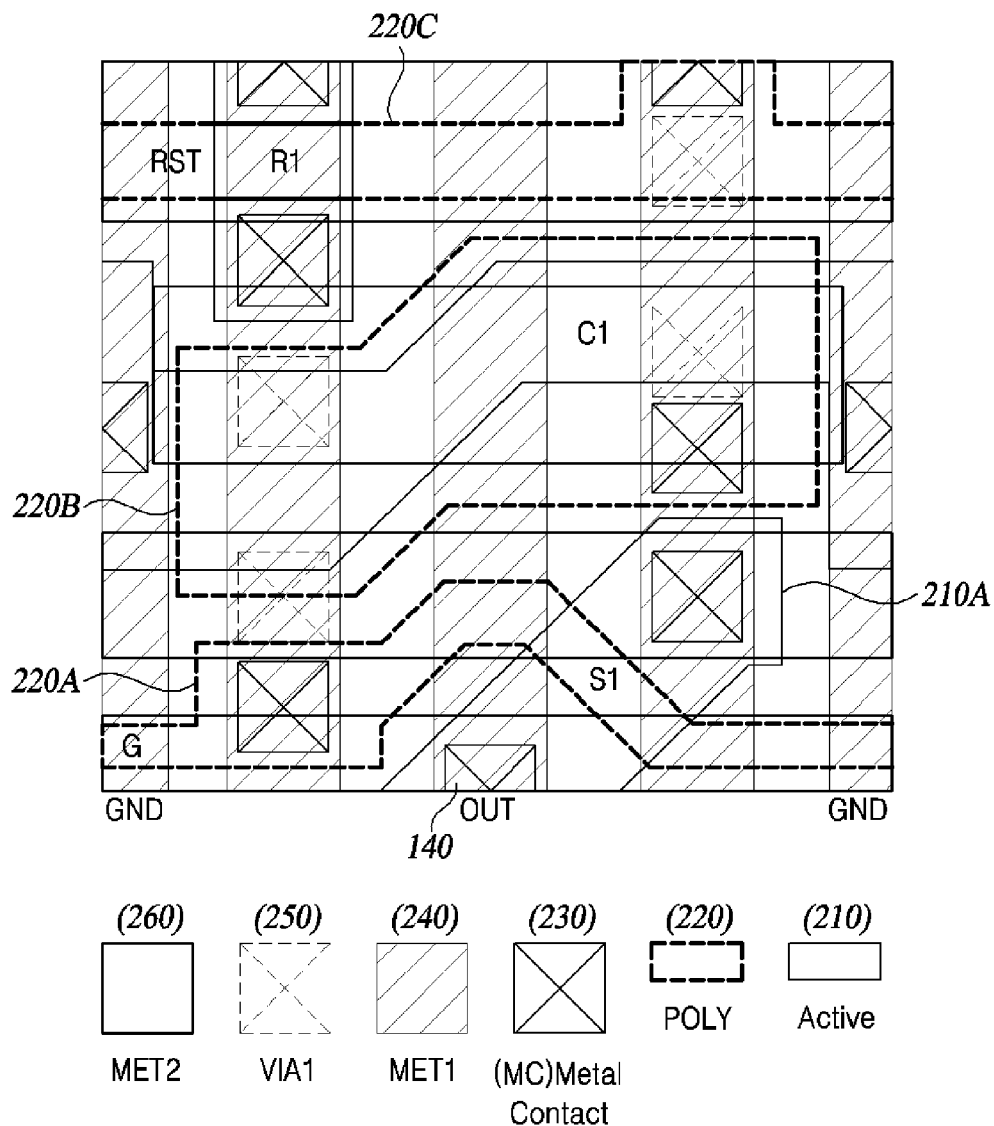
FIG. 3A is a plan view illustrating a layout of a pixel structure on an LCoS display according to at least one embodiment of the present disclosure.

FIG. 3A is a plan view illustrating a layout of a pixel structure on an LCoS display according to at least one embodiment of the present disclosure.

Figure 3B:
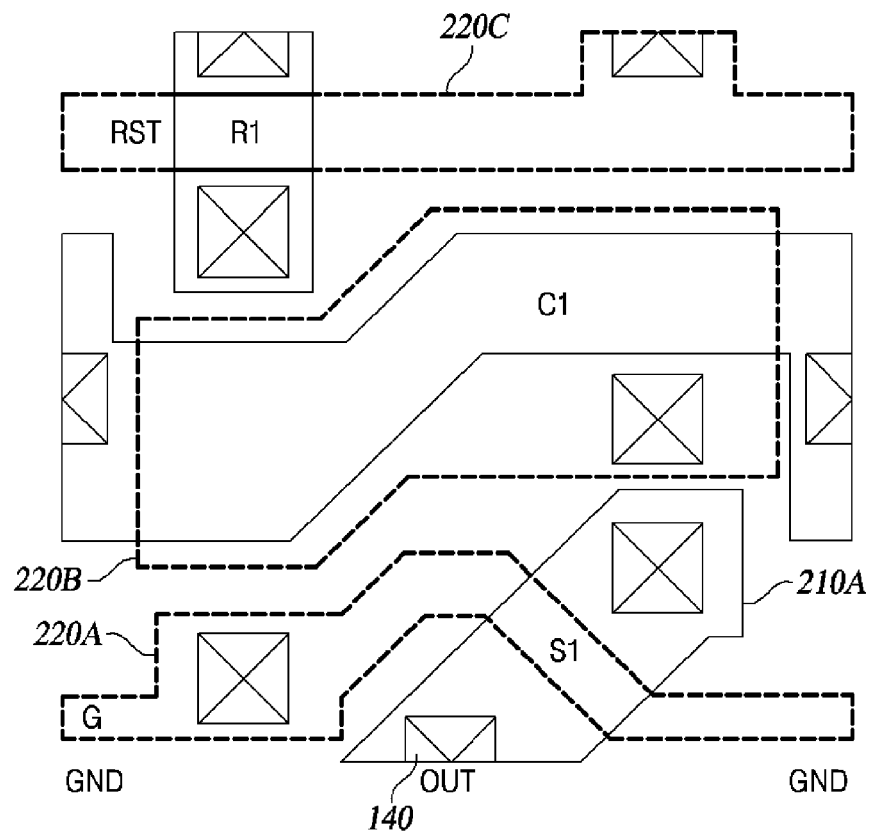
FIG. 3B is a plan view illustrating active area, polysilicon and metal contact depicted in FIG. 3A.

FIG. 3B is a plan view illustrating active area, polysilicon and metal contact depicted in FIG. 3A.

In FIGS. 3A and 3B, only half of the output terminal 140 of the LCoS display pixel is shown. The pixel structure shown in FIGS. 3A and 3B shares the output terminal 140 with an adjacent bottom pixel.

As shown in FIGS. 3A and 3B, the active area 210A connected to the output terminal 140 forms the source or drain of the switch transistor 110, and it extends diagonally in a direction intersecting with the polysilicon 220A that forms the gate of the switch transistor 110 and thereby the active area 210A is shared by an adjacent pixel. This configuration of the LCoS display pixel structure according to the present disclosure allows a designer to make its structural drawing 1.4 times larger than the conventional structure when compared by a unit area, thereby securing flexibility in circuit design.

When the pixel is viewed from above, the switch transistor 110 includes a rectangular shape in which active areas 210A having diagonal shape and the polysilicon 220A having diagonal shape are overlapped. The switch transistor 110 is symmetrical to other switch transistors 110 of adjacent pixels. The polysilicon 220A forming the gate of the switch transistor 110 intersects the active area 210A, and it can be seen from the plan views of FIGS. 3A and 3B that the intersecting area forms a rectangular overlap.

The polysilicon 220A forming the gate of the switch transistor 110 includes one or more diagonal shape which connects two rectangles (left and right rectangles) when viewed from above toward the pixel.

The polysilicon 220B forming the storage capacitor 120 when viewed from the top toward the pixel includes at least three (first, second, and third) rectangles of which the left and right (first and third) rectangles of the central (second) rectangle are connected in a diagonal shape.

The polysilicon 220C forming the reset transistor 130 includes at least two (fourth and fifth) rectangles. The fifth rectangle is located on one side of a long side of the fourth rectangle when viewed from above toward the pixel.

Figure 4:
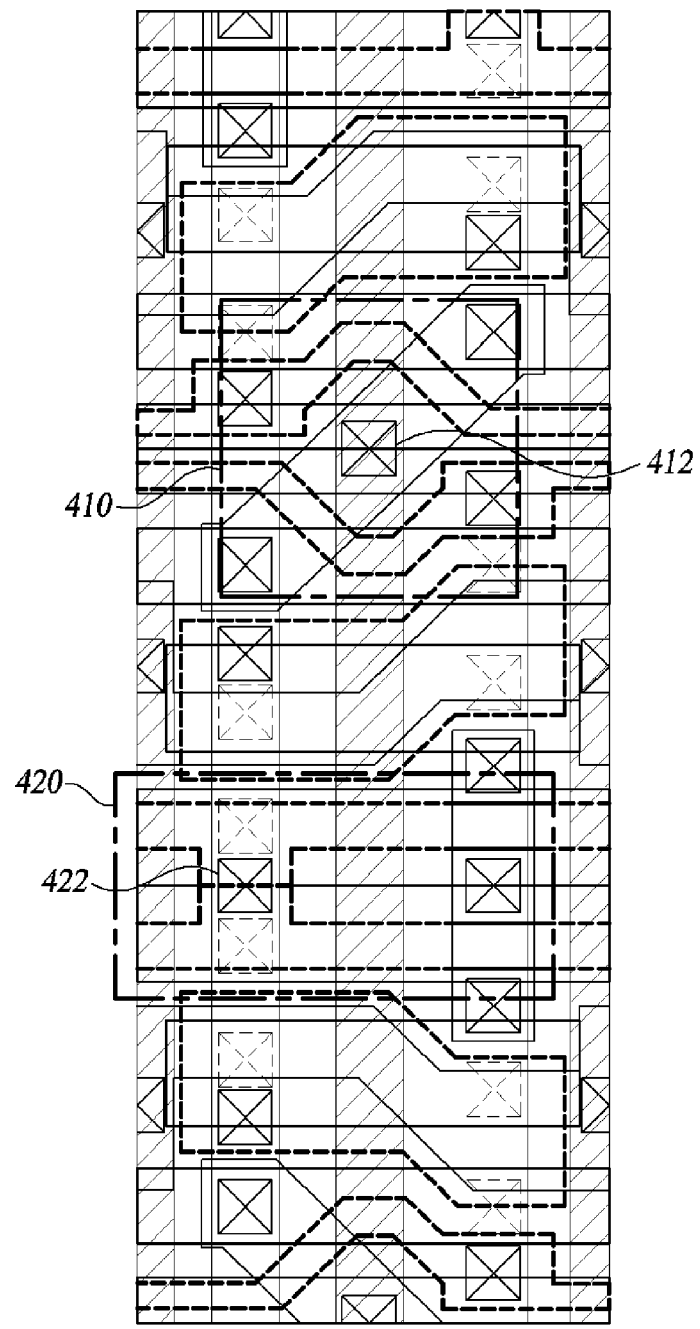
FIG. 4 is a plan view illustrating a layout of a plurality of pixel structures present on an LCoS display according to at least one embodiment of the present disclosure.

FIG. 4 is a plan view of a plurality of pixel structures present on an LCoS display according to at least one embodiment of the present disclosure.

As shown in FIG. 4, the LCoS display pixel structure according to at least one embodiment shares output terminals 140 with adjacent pixels. As illustrated by a first symmetric area 410 of FIG. 4, the LCoS display pixel structures are symmetric with neighboring pixels adjacent to each other up and down. For example, the LCoS display pixel structure is designed to share the output terminals 140 by providing the metal contact 412 centrally of the boundary line between an upper pixel and a lower pixel.

With the switch transistor 110 of the lower pixel designed symmetrically with the switch transistor 110 of the upper pixel, the user can sufficiently secure a process margin advantageously.

As illustrated by a second symmetric area 420 of FIG. 4, the LCoS display pixel structures are symmetrical with neighboring pixels adjacent to each other up and down. For example, the LCoS display pixel structure is designed to have the metal contact 422 to be shared by providing the metal contact 422 centrally of the boundary line between the upper pixel and the lower pixel.

With the reset transistor 130 of the lower pixel designed symmetrically with the reset transistor 130 of the upper pixel, the user can sufficiently secure the process margin advantageously.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A pixel structure of a Liquid Crystal on Silicon (LCoS) display, the pixel structure comprising:
    a switch transistor connected to a source line;
    a storage capacitor configured to store electric power transmitted through the switch transistor; and
    a reset transistor directly connected to the storage capacitor,
    wherein the switch transistor, the storage capacitor, and the reset transistor are respectively including an active area and polysilicon,
    wherein the pixel structure is further including an output terminal that is connected by a metal contact (MC) to the active area, and
    wherein the metal contact is shared by an adjacent pixel.

2. The pixel structure of claim 1, wherein the switch transistor has a diagonal shape.

3. The pixel structure of claim 1, wherein the switch transistor has a gate formed of polysilicon into a diagonal structure of two joined rectangular shapes when viewed from above toward the pixel.

4. The pixel structure of claim 1, wherein the switch transistor has one terminal that is connected to a source line and has another terminal that is connected to one terminal of the storage capacitor.

5. The pixel structure of claim 4, wherein the reset transistor has one terminal that is connected to one terminal of the storage capacitor.

6. The pixel structure of claim 5, wherein the reset transistor has a gate formed of polysilicon into a structure of at least two rectangular shapes composed of one rectangle joined with one side of a long side of the other rectangle when viewed from above toward the pixel.

7. The pixel structure of claim 5, wherein the storage capacitor has one terminal that is connected to a contact point between the switch transistor and the reset transistor.

8. The pixel structure of claim 7, wherein the storage capacitor is formed of polysilicon into a diagonal structure of at least three rectangular shapes composed of a central rectangle joined with two side rectangles when viewed from above toward the pixel.

* * * * *